United States Patent [19]
Kawano et al.

[11] Patent Number: 6,167,205
[45] Date of Patent: Dec. 26, 2000

[54] DATA-IMPRINTING CAMERA

[75] Inventors: Kiyoshi Kawano, Saitama-ken; Yutaka Ohsawa, Tokyo, both of Japan

[73] Assignee: Asahi Kogaku Kogyo Kabushiki Kaisha, Tokyo, Japan

[21] Appl. No.: 09/383,412

[22] Filed: Aug. 26, 1999

[30]     Foreign Application Priority Data

Aug. 27, 1998   [JP]   Japan .................................. 10-242259

[51] Int. Cl.⁷ .................................................. G03B 17/24
[52] U.S. Cl. ............................................................ 396/315
[58] Field of Search .................................... 396/315, 318, 396/310, 319

[56]                References Cited

U.S. PATENT DOCUMENTS

| | | | |
|---|---|---|---|
| 5,247,321 | 9/1993 | Kazami | 396/319 |
| 5,422,694 | 6/1995 | Yoshida et al. | 396/315 |
| 5,548,361 | 8/1996 | Soshi et al. | 396/315 |

FOREIGN PATENT DOCUMENTS 2613335   5/1997   Japan .

*Primary Examiner*—W. B. Perkey
*Attorney, Agent, or Firm*—Greenblum & Bernstein, P.L.C.

[57]               ABSTRACT

A data-imprinting camera includes a winding mechanism for manually winding a film loaded in a camera body, a data imprinting device for imprinting patterns of data onto the film, the data imprinting device having a plurality of light emitting elements arranged such that light dots formed on the film are aligned in the direction perpendicular to the winding direction of the film, and a controlling device for controlling the emissions of the light emitting elements in synchronism with the winding of the film by the winding mechanism, the controlling device including a function to detect condition of the data imprinting and a function to repeat the data imprinting in one picture frame of the film when the detected result is faulty.

12 Claims, 8 Drawing Sheets

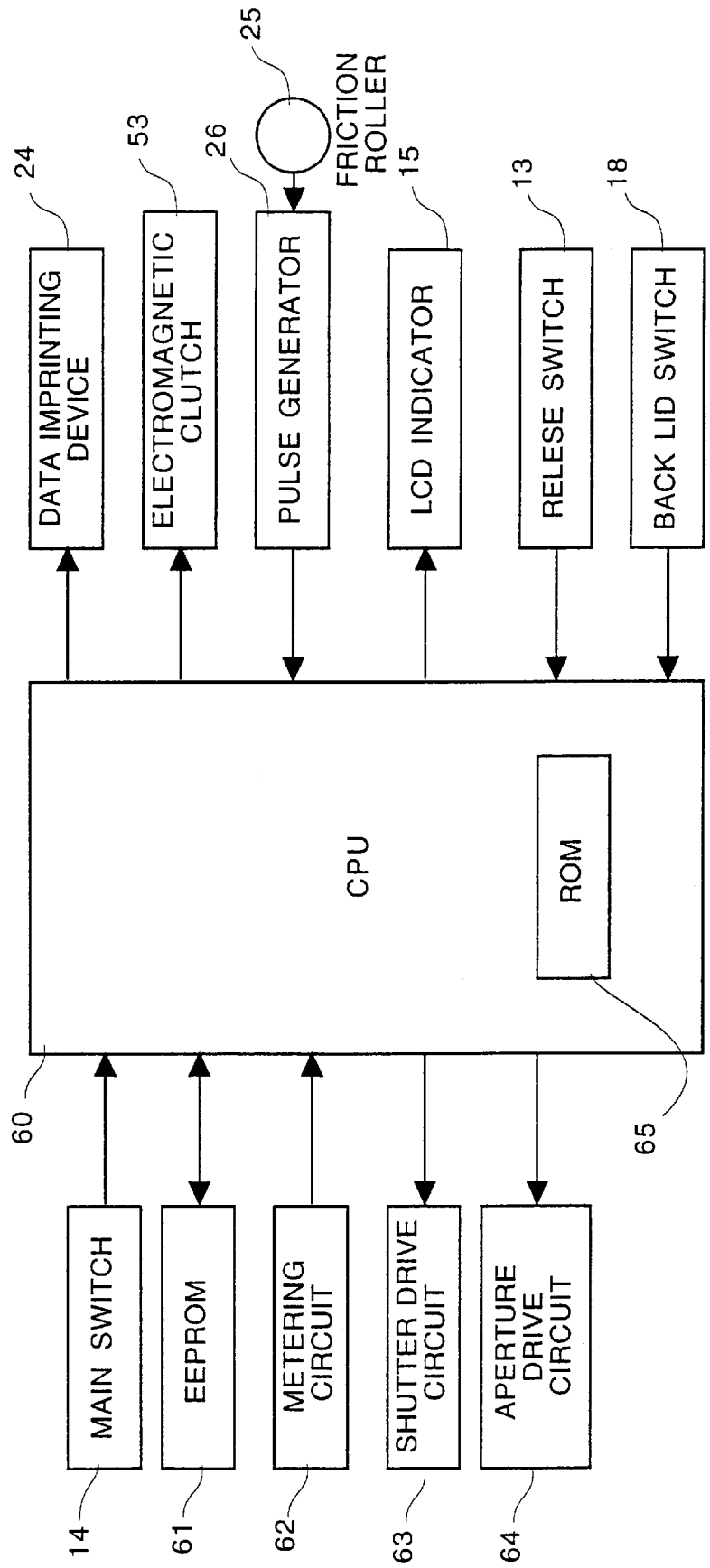

FILM WINDING DIRECTION

FILM PULSE

EMISSION ORDER OF LED

DATA-IMPRINTING CAMERA

BACKGROUND OF THE INVENTION

The present invention relates to a data-imprinting camera that is capable of imprinting data on a roll film wound by a manual operation.

The data-imprinting camera imprints photographing data such as a shutter speed, an aperture value or a date on an area outside a picture area of a roll film. A data imprinting device of the camera includes a light emitting unit for exposing the film to form a two dimensional pattern as the imprinting data.

There are two types of the data imprinting devices. The first type device is an one-shot exposure data imprinting device that is provided with a two dimensional light emitting device to form the two dimensional pattern at one exposure timing. The one-shot exposure data imprinting device is relatively large in size, and therefore the device is mounted on a back cover of the camera to expose the film from behind, i.e., from the back surface of the film that is opposite to an image forming surface.

The second type device is a scanning exposure data imprinting device that is provided with a plurality of light emitting diodes (LED's) arranged on a line perpendicular to the winding direction of the film. The LED's are controlled in synchronism with the winding of the film to sequentially form the two dimensional pattern. The scanning exposure data imprinting device is relatively small in size, and therefore it can be mounted on the back cover as well as the one-shot exposure data imprinting device or on a side of the aperture to expose the front surface of the film that is the same as the image forming surface.

A medium-format camera using a Brownie film (120 film) is provided with the scanning exposure data imprinting device. Since the Brownie film has a baking paper on the back surface thereof, the data imprinting device must project the light pattern from the front side of the film. Accordingly, the scanning exposure data imprinting device is used for the medium-format camera.

In the scanning exposure data imprinting device, light emissions of the LED's are controlled in synchronism with pulses that are generated corresponding to the film winding.

However, since the scanning exposure data imprinting device imprints the pattern in synchronism with the film winding, the film winding at the constant speed forms the proper pattern, while the variation of the winding speed disturbs to form the proper pattern. That is, when the camera is provided with a motor drive winding mechanism, the scanning exposure data imprinting device imprints the proper pattern, while a manual winding mechanism may disturbs to form the proper pattern.

Particularly, when a film wind lever is manually operated with short, quick operations, which breaks correspondence between the pulse interval and the film winding speed. For instance, when the film is rapidly wound and then stopped by the manual operation, the pulse generating mechanism generates over-pulse due to inertial moment, which makes the data imprinting device continue the data imprinting onto the stopped film, overlapping the plural exposures on the same position. For instance, when the LED's of the data imprinting device are controlled to form the pattern of "8", the pattern of "8" is formed on the winding film as shown in FIG. 8A, while the pattern of "1" is formed on the stopped film as shown in FIG. 8B due to multiple exposure.

SUMMARY OF THE INVENTION

It is therefore an object of the present invention to provide a data-imprinting camera having a manual winding mechanism and a scanning type imprinting device, which is capable of increasing possibility to imprint proper patterns on a film.

For the above object, according to the present invention, there is provided a data-imprinting camera, which includes:

a winding mechanism for manually winding a film loaded in a camera body;

a data imprinting device for imprinting patterns of data onto the film; and a controlling device for controlling the data imprinting device in synchronism with the winding of the film by the winding mechanism, the controlling device being capable of repeating the data imprinting in one picture frame of the film.

With this construction, since the patterns of the data can be imprinted at a plurality of times, increasing the possibility to imprint proper pattern even if the winding speed varies during the data imprinting.

The controlling device preferably includes a function to detect condition of the data imprinting and a function to repeat the data imprinting of the same data in the one picture frame when the detected result is faulty.

The controlling device may judge that the detected result is faulty when a moving speed of the film is slower than a predetermined speed. In such a case, the controlling device may repeat to imprint the data that was being imprinted when the detected result is judged to be faulty.

In particular case, the controlling device controls the light emission elements to form a plurality of kinds of data patterns including a plurality of characters, and the controlling device may repeat to imprint the data that was being imprinted when the detection result was faulty, from the first character thereof.

The data imprinting device may have a plurality of light emitting elements arranged such that dots formed on the film are aligned in the direction perpendicular to the winding direction of the film. In such a case, the controlling device controls the emissions of the light emitting elements in synchronism with the winding of the film to expose dot patterns indicating the data onto the film.

Further, the data-imprinting camera may include:

a follower roller that is rotated in synchronism with the winding of the film, a pulse generating mechanism that generates pulses corresponding to the rotation of the follower roller, and a timer that periodically generates a plurality of timing signals between two consecutive edges of the pulses.

With this construction, the controlling device uses the edge of the pulses as separators of characters of the data and uses the timing signals for determining emission timings of the light emitting elements. The controlling device is able to determine that the detected result is faulty when the predetermined numbers of edges of the pulses are not detected in the predetermined time interval.

The data may include one of a shutter speed, an aperture value, an exposure compensation value, a focal length or a date of photographing.

According to another aspect of the invention, there is provided a data-imprinting device for a camera, which is provided with a plurality of light emitting elements, a data imprinting condition detection system, and a controlling device. The light emitting elements form a plurality of light dots on a film of the camera. The plurality of light emitting elements are arranged such that the light dots formed on the film are aligned in the direction perpendicular to a winding direction of the film. The imprinting condition detecting system detects whether imprinting of the data for a picture frame has been finished successfully. The controlling device repeats data imprinting operation for the picture frame when the imprinting condition detecting system detects that imprinting of the data for the picture frame has not been finished successfully.

DESCRIPTION OF THE ACCOMPANYING DRAWINGS

FIG. 4 is a block diagram of an electronic circuit installed in the data-imprinting camera of FIG. 1;

DESCRIPTION OF THE EMBODIMENTS

Figure 1:
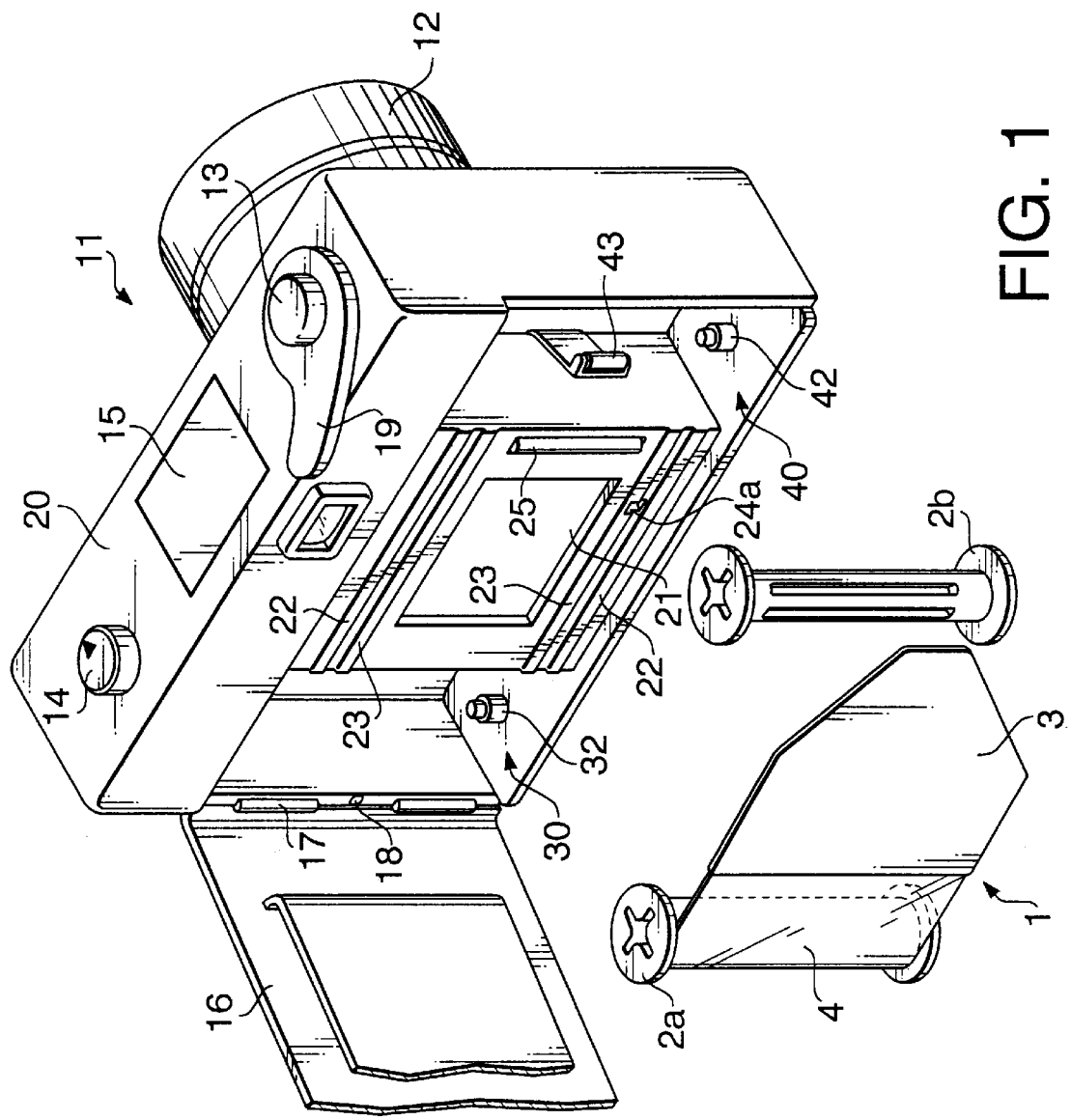
FIG. 1 is an external perspective view of a data-imprinting camera according to an embodiment.

An embodiment of the present invention will be described in the embodiment, the invention is applied to a medium-format camera used for the Brownie film. FIG. shows an external appearance of the camera 11 according to the embodiment.

The camera 11 consists of a camera body 20 and a photographing lens 12 attached to the front side of the camera body 20. On the upper panel of the camera body 20, a release switch 13 that releases a shutter, a main switch 14 that switches ON/OFF of the power supply, and an LCD indicator 15 are arranged. Further, a film wind lever 19 is rotatably mounted on one end of the upper panel of the camera body 20.

The back side of the camera body 20 can be covered by a back lid 16 that is rotatably supported on the camera body 11 by a hinge 17. A back lid switch 18 is arranged next to the hinge 17 to detect an open/close condition of the back lid 16.

When the back lid 16 opens as shown in FIG. 1, an inner construction of the camera body 20 is exposed. An aperture 21 opens at back side of the photographing lens 12 so that light from an object through the photographing lens 12 reaches the loaded film. A pair of outer rails 22 and 22 are formed on upper and lower sides of the aperture 21 with extending along the film winding direction. In the same manner, a pair of inner rails 23 and 23 are formed with the aperture 21 between. A slit window 24a for a data imprinting device is formed between the lower outer rail 22 and the lower inner rail 23.

Figure 2:
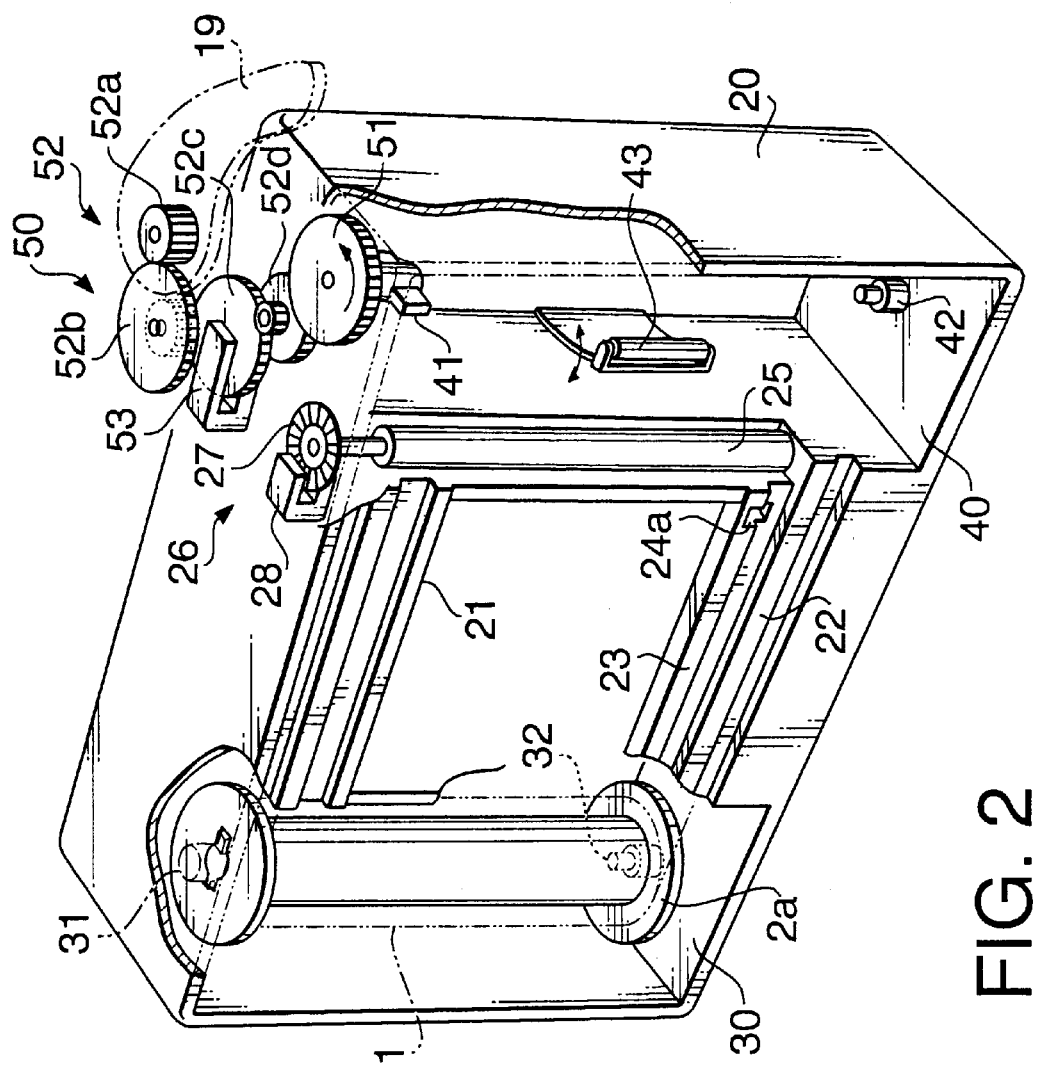
FIG. 2 is an internal perspective view of the data-imprinting camera of FIG. 1.

At the side portions of the camera body 20, a first spool chamber 30 and a second spool chamber 40 are arranged with the aperture 21 therebetween. The Brownie film 1, which consists of a film 4 and a backing paper 3, is rolled up around a first spool 2a. When the Brownie film 1 is set in the camera 11, the first spool 2a is set in the first spool chamber 30 and a second spool 2b is set in the second spool chamber 40. Then the tip of the film 1 is connected to the second spool 2b. AS shown in FIG. 2, which is an internal perspective view of the camera body 20, an upper pivot 31 and a lower pivot 32 are formed in the first spool chamber 30 for supporting the first spool 2a. In the second spool chamber 40, an upper drive shaft 41 is formed for rotating the second spool 2b and a lower pivot 42 is formed for supporting the second spool 2b. Further, a film support roller 43 is arranged in the second spool chamber 40. The film support roller 43 is attached on a leaf spring to press the film 1 rolled around the second spool 2b in order to avoid the slack of the film 1.

The upper driving shaft 41, the film wind lever 19 and a gear train 52 constitute a winding mechanism 50 for 1s manually winding the film 1 loaded in the camera body 20. The gear train 52 consists of four gears 52a, 52b, 52c and 52d for transmitting a rotation of the film wind lever 19 toward a drive gear 51 fixed to the upper drive shaft 41. Namely, the first gear 52a is fixed to the film wind lever 19 and the first gear 52a engages with the second gear 52b. The third gear 52c engages with the second gear 52b and the fourth gear 52d. Finally, the fourth gear 52d engages with the drive gear 51. A rotation of the film wind lever 19 rotates the upper drive shaft 41, rotating the second spool 2b set at the second spool chamber 40, which winds the film 1 rolled around the first spool 2a to the second spool 2b. A full stroke rotation of the film wind lever 19 winds the film 1 by one frame length.

An electromagnetic clutch 53 is attached to the third gear 52c of the gear train 52. The electromagnetic clutch 53 is controlled by a CPU 60 (described below) to connect or disconnect the engagement between the third gear 52c and the fourth gear 52d. When these gears are engaged with each other, the rotation of the film wind lever 19 transmits to the upper drive shaft 41. On the other hand, when the engagement of these gears is disconnected, the film wind lever 19 becomes free, the rotation of the lever does not wind the film 1.

A friction roller (a follower roller) 25 is arranged is between the aperture 21 and the second spool chamber 40. The friction roller 25 contacts the film 1 and it is rotated in synchronism with the winding of the film 1. A pulse generating mechanism 26 is connected to the friction roller 25 to generate pulses corresponding to the rotation of the friction roller 25. The pulse generating mechanism 26 consists of a slit disk 27 on which many slits extending along radial direction are formed and a photo-interrupter 28 in which an LED and a photodiode are mounted with the slit disk 27 therebetween. The rotation of the friction roller 25 rotates the slit disk 27, which causes the photo-interrupter 28 to generate film pulses.

Figure 3A:
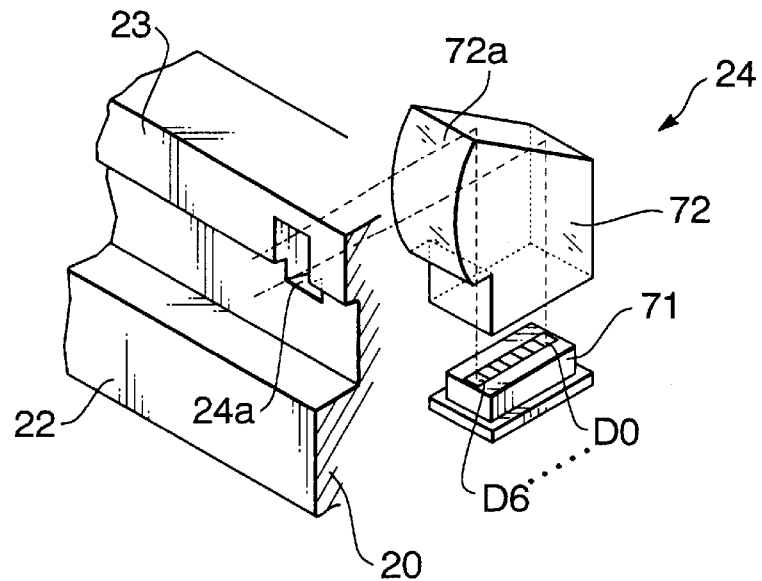
FIG. 3A is a perspective view of a light emitting portion of a data imprinting device mounted on the data-imprinting camera of FIG. 1.
Figure 3B:
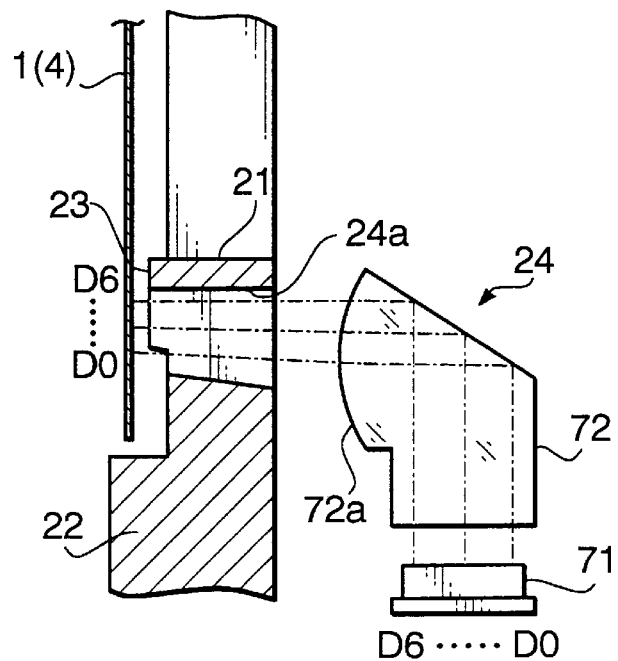
FIG. 3B is a sectional view of the light emitting portion of FIG. 3A.

The construction of the data imprinting device will be described with reference to FIGS. 3A and 3B. The data imprinting device 24 includes a light emitting unit 71 and a cylindrical lens prism 72. The light emitting unit 71 is provided with seven LED's D0 through D6 as light emitting elements that are one dimensionally arranged. The cylindrical lens prism 72 is a combination of the right angle prism and a cylindrical lens formed on the exit surface 72a. The light from each LED is totally reflected by the slope of the prism 72, and then the light is converged by the cylindrical lens. The convergent light travels through the slit window 24a and forms a light dot on the film 1. The direction of the arrangement of the LED's is determined so that the light dots formed on the film are aligned in the direction perpendicular to the film winding direction. The LED's D0 through D6 are controlled in synchronism with the winding of the film 1 to sequentially form the one dimensional patterns to form the two dimensional pattern as a series of the one dimensional patterns.

FIG. 4 shows an electronic circuit installed in the data-imprinting camera 11. Switch data from the main switch 14, the release switch 13 and the back lid switch 18 are input in the CPU 60 that operates according to a program stored in a built-in ROM 65. The CPU 60 also receives data from a metering circuit 62 to determine the shutter speed and the aperture value. A shutter drive circuit 63, an aperture drive circuit 64, the electromagnetic clutch 53 and the LCD indicator 15 are controlled by the CPU 60.

The film pulses generated by the pulse generating mechanism 26 in synchronism with the rotation of the friction roller 25 is also input in the CPU 60. An EEPROM 61 has a data table to convert numerical data into emission sequence data that are used to control the data imprinting device 24.

The CPU 60 prepares the numerical data, and then the CPU 60 converts the numerical data into the emission sequence data using the data table in the EEPROM 61. The CPU 60 controls the LED's of the data imprinting device 24 according to the emission sequence data in synchronism with the film pulses from pulse generating mechanism 26.

In the embodiment, the data imprinting device 24 is controlled to form data pattern representing TV data (shutter speed), AV data (aperture value) and XV data (exposure compensation value).

Figure 5A:
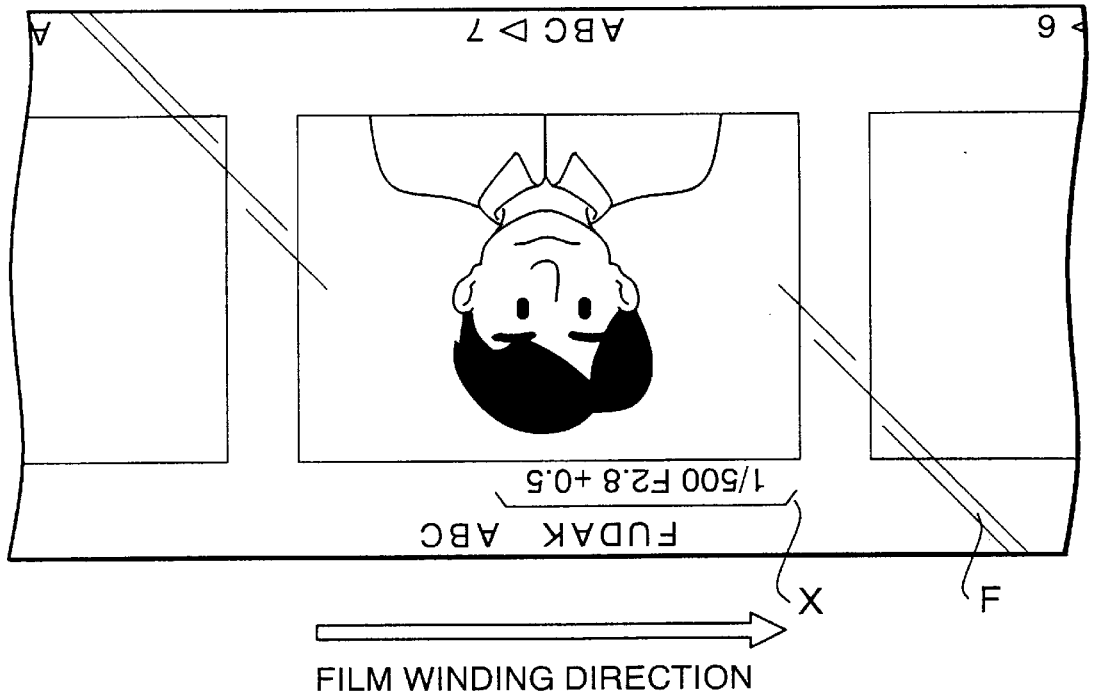
FIG. 5A shows a film on which the data pattern is properly imprinted.
Figure 5B:
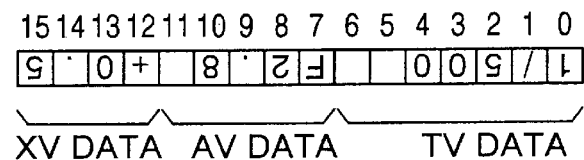
FIG. 5B shows the data pattern and the character numbers.

FIG. 5A shows a sample of a film F in which data pattern X is imprinted on the area outside the picture area. The imprinted data X includes the TV data "1/500", the AV data "F2.8" and the XV data "+0.5" (i.e. three items). The imprinted data X consists of 16 characters including spaces as shown in FIG. 5B for one picture frame in this sample. The TV data has seven characters (0–6), the AV data has five characters (7–11) and the XV data has four characters (12–15).

Figure 5C:
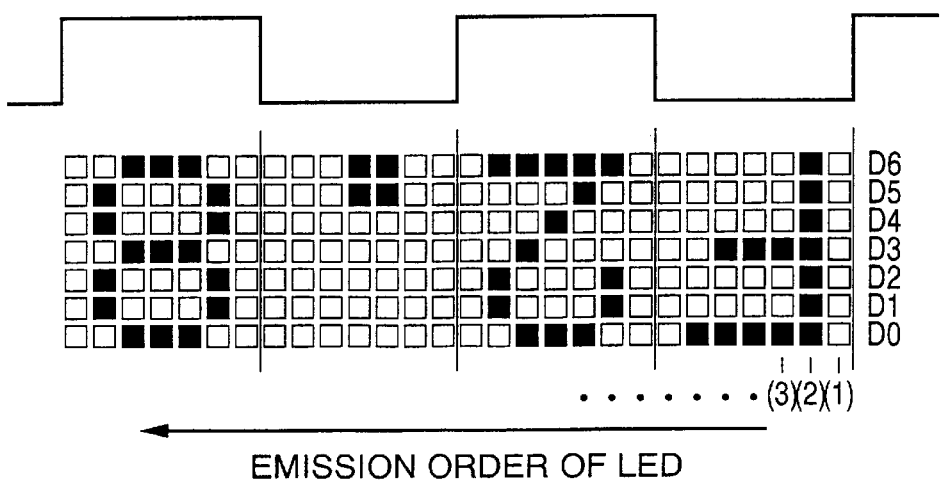
FIG. 5C shows the emission sequence data.

Each character of the data pattern X is formed as 7×7 dots matrix as shown in FIG. 5C. That is, one line includes 7 dots corresponding to the seven LED's and one character includes 7 lines. Further, one character is exposed in an interval between two consecutive edges of the film pulses. In the specification, ON/OFF of the LED's on one line is defined as an "emission data". The emission sequence data is a series of the emission data. In the emission sequence data, ON/OFF of the LED is represented by 1/0. For instance, the AV data "F2.8" is imprinted as shown in FIG. 5C. The emission data of the first line (1) of the first character "F" of the AV data is "0000000", that of the second line (2) is "1111111" and that of the third line (3) is "1001000". The emission data is arranged from the data of the LED D0 to the LED D6. Since one byte is allocated for one line data in the EEPROM 61, seven-bytes are allocated for one character.

The CPU 60 is a controlling device being capable of repeating the data imprinting in one picture frame of the film. Particularly, the CPU 60 has a function to detect condition of the data imprinting and a function to repeat the data imprinting of the same data for the one picture frame when the detected result is faulty.

Next, the operation of the camera 11 will be described with reference to flowcharts shown in FIGS. 6 and 7. Particularly, the descriptions are directed to the control of the data imprinting and the actuation of the pulse generating mechanism 26 and the data imprinting device 24.

Figure 6:
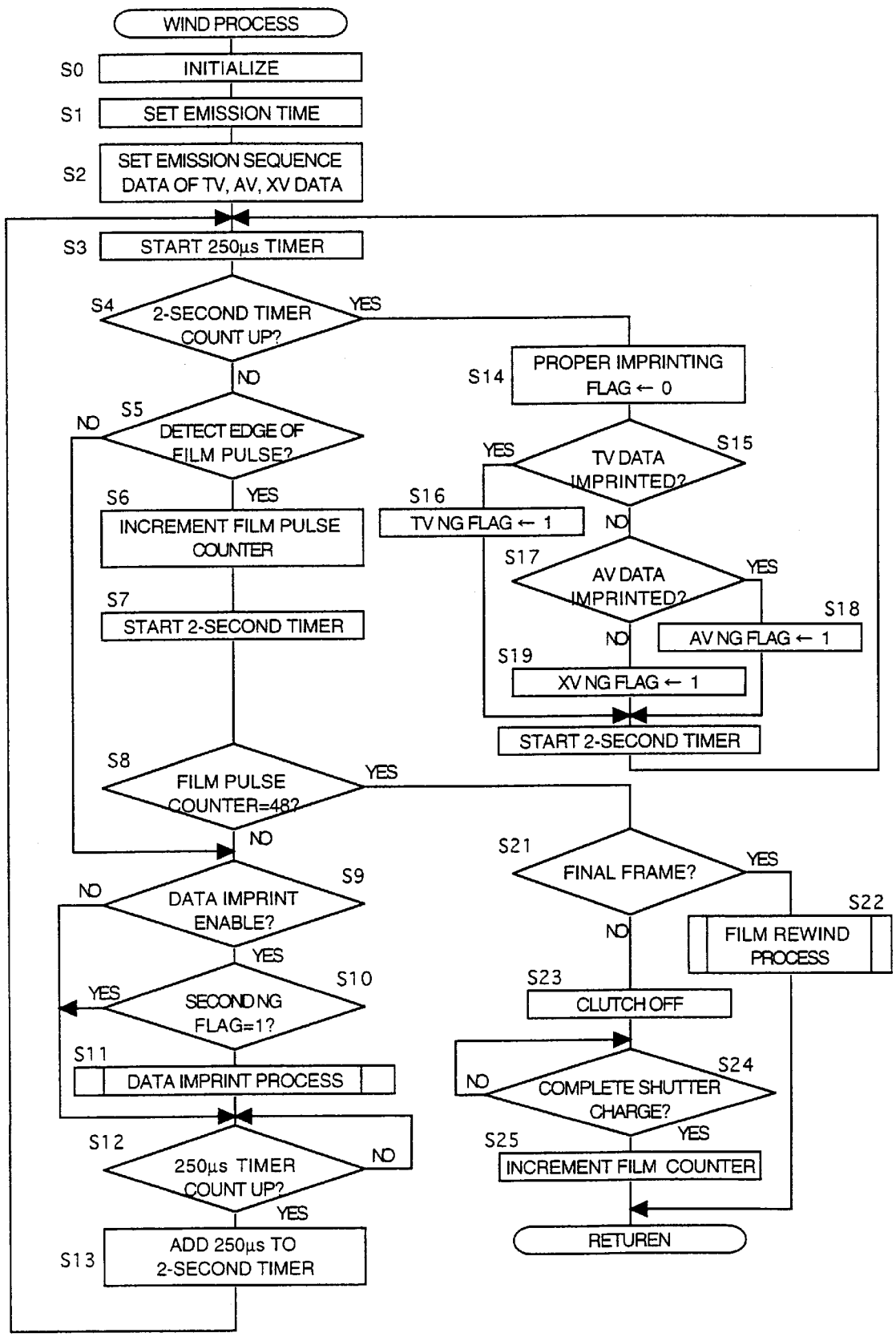
FIG. 6 is a flowchart showing a film winding process of the data-imprinting camera of FIG. 1.
Figure 7:
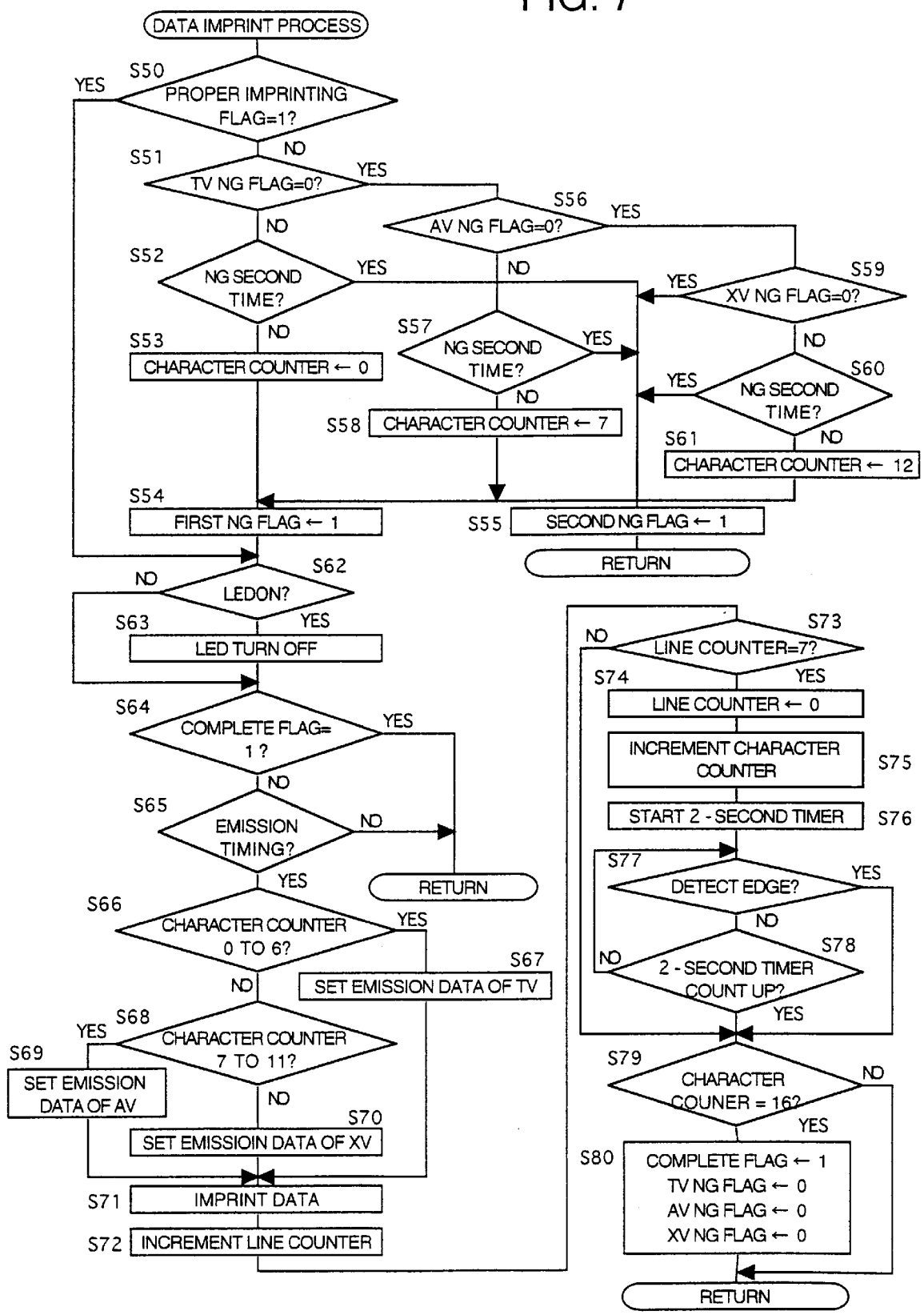
FIG. 7 is a flowchart showing a data imprinting process of the data-imprinting camera of FIG. 1.

FIG. 6 shows a film winding process and FIG. 7 shows a data imprinting process executed in step S11 of the film winding process. The film winding process is called after a photographing of one frame. After the photographing of a frame, a user rotates the film wind lever 19 to wind the film by the one frame length. During the winding, the data pattern is imprinted onto the film.

In step S0 of FIG. 6, counters and flags are initialized. A film pulse counter, a line counter and a character counter are set to "0", a complete flag, a first NG flag, a second NG flag, a TV NG flag, an AV NG flag and an XV NG flag are set to "0", and a proper imprinting flag is set to "1".

An emission time is set in step S1. The emission time is determined based on the film speed so that the LED's D0 through D6 expose the film to form a proper data pattern. The CPU 60 receives the numerical data of the AV, TV and XV data at the photographing, and then the CPU 60 converts the numerical data into the emission sequence data using the data table of the EEPROM 61 to set them into registers in step S2.

The loop of steps S3 through S13 repeats at 250 μs intervals due to steps S3 and S12. The 250 μs timer starts in step S3, and the time up of the 250 μs timer is waited in step S12. The 250 μs timer is a software timer that repeats the counting intervals of 250 μs and the 250 μs timer outputs the timing signal at the timing of the time-up thereof. Since the 250 μs interval is shorter than the interval between the consecutive edges of the film pulse, the 250 μs timer periodically generates a plurality of timing signals between two consecutive edges of the film pulses.

The CPU 60 waits for the detection of an edge of the film pulse generated by the pulse generating mechanism 26 in step S5. After detection of the first edge of the film pulse, the CPU 60 enables the data imprinting, which causes the judgement of step S9 "YES", enabling the data imprinting process in step S11. However, if the second NG flag is "1", it means that consecutive faults of the data imprinting, the data imprinting process is skipped by the judgement in step S10.

Every detection of the edge of the film pulse increments the film pulse counter in step S6 and starts a 2-second timer in step S7. Since the one frame winding generates 48 edges of the film pulses, when the film pulse counter is determined to be "48" in step S7, the loop is broken and steps S21 through S25 are executed. Namely, if the photographed frame is determined as the final frame in step S21, a film rewind process is executed in step S22. If it is not the final frame, the electromagnetic clutch 53 turns OFF to disconnect the transmission from the film wind lever 19 to the upper drive shaft 41 in step S23. The CPU 60 waits for a completion of the shutter charge in step S24, and then increments a film counter in step S25.

In step S13, 250 μs is added to a 2-second timer. The 2-second timer is used to watch the interval from the detection of the edge of the film pulse. If the wind process continues 2 seconds after the previous edge detection, it is determined that moving speed of film becomes slower than a predetermined speed and the data imprinting is faulty. The judgement of step S4 using the 2-second timer functions to detect condition of the data imprinting. Therefore, if the judgement of the step S4 is "YES", an NG wind process of steps S14 through S20 is executed to set the NG flag. The proper imprinting flag is set to "0" instepS14. If the TV data is being imprinted, the judgement of step S15 is "YES", the TV NG flag is set to "1" in step S16. Else if the AV data is being imprinted, the judgement of step S17 is "YES", the AV NG flag is set to "1" in step S18. Otherwise, the XV data NG flag is set to "1" in step S19. These NG flags represent the results of the detection and the setting of "1" of the NG flag repeats the data imprinting of the same data in one picture frame in steps of FIG. 7. After the NG flag setting, the 2-second timer starts in step S20, and then the process continues the loop of steps S3 through S13.

As described above, the data imprinting process is called every 250 μs. The data imprinting process shown in FIG. 7 exposes one line for one call. Namely, an exposure of one character requires that the process shown in FIG. 7 is repeated seven times.

In step S50 of FIG. 7, the condition of the proper imprinting flag is judged. This flag is set to "0" in step S14 when the data imprinting is faulty. When the flag is "0", the character counter is set to the value indicating the head position (i.e. the position of the first character) of the TV, AV or XV data according to the conditions of the TV, AV and XV NG flags in steps 51 through S61. When the TV NG flag is "1" (S51), it means that the data imprinting fails during the TV data imprinting, the character counter is set to "0" (S53) that represents the head position of the TV data to rewrite the TV data pattern. When the TV NG flag is "0" and the AV NG flag is "1" (S56), the character counter is set to "7" (S58) that represents the head position of the AV data. When the TV and AV NG flags are "0" and the XV NG flag is "1" (S59), the character counter is set to "12" (S61) that represents the head position of the XV data.

At the first fault of the data imprinting, the character counter is set as described above, the first NG flag is set to "1" in step S54 and the data imprinting process continues. After second fault, the counter setting is skipped in step S52, S57 or S60, and the second NG flag is set to "1" in step S55. In such a case, the process does not imprint the data pattern and returns to the wind process of FIG. 6.

When the data is properly imprinted or the fault is the first time, the CPU 60 turns off the LED's when the LED's are ON in steps S62 and S63. Then the complete flag and the emission timing are checked in steps S64 and S65. When the complete flag is "1", it means that the data pattern has been completely imprinted, the process skips the following steps in the data imprinting process and returns to the wind process. In the same manner, the process returns to the wind process when it is not an emission timing. Since the interval of the timing signals are too short to form the two dimensional pattern, the CPU 60 thins out the timing signals from the 250 μs timer.

The CPU 60 controls the LED's D0 through D6 to imprint one line pattern based on the emission sequence data, the character counter and the line counter. The character counter indicates a current character position in the data pattern. The line counter indicates a current line in the character. The effective range of the value of the character counter is 0 to 15, and that of the line counter is 0 to 6.

When the character counter falls in the range "0–6" (S66), the emission data of the TV data for the current line is set in step S67. The emission data includes ON/OFF data of each of the seven LED's D0 through D6. When the character counter falls in the range "7–11" (S68), the emission data of the AV data for the current line is set in step S69. Otherwise, the emission data of the XV data for the current line is set in step S70.

After setting the emission data, the data of the current line is imprinted in step S71. That is, the LED's whose emission data are "1" are turned ON to emit lights.

After the data imprinting, the CPU 60 increments the line counter in step S72. When the line counter becomes "7" (S73), it means the finish of the imprint of the current character, the line counter is set as "0" in step S74 and the character counter is incremented in step S75. In such a case, the 2-second timer starts in step S76, and then the loop of steps S77 and S78 is repeated until the edge of the film pulse is detected or the 2-second timer counts up. The CPU 60 waits the next edge of the film pulse so that the edge is used for a separator of the characters. When the CPU 60 detects the edge of the film pulse before time-up of the 2-second timer, the judgement in step S5 in FIG. 6 becomes "YES" and the film pulse counter is incremented in step S6.

In step S79, the CPU 60 checks whether the character counter is "16". Since the character counter "16" represents that the data pattern has been imprinted, when the character counter indicates "16", the complete flag is set to "1" and the TV, AV and XV flags are set to "0" in step S80. Otherwise, when the character counter is smaller than 16, step S80 is skipped. In any case, the process returns to the wind process.

In regular case, when the user rotates the film wind lever 19 by the full stroke with constant speed, the process repeats the loop of steps S3 through S13 in FIG. 6 and the steps S50, S62 through S81 in FIG. 7 to imprint the data pattern until the character counter reaches "16". After that, the loop of steps S3 through S13 and steps S50, S62 through S64 until the film pulse counter reaches "48". The data pattern X as shown in FIG. 5A is imprinted on the film F.

Figure 8A:
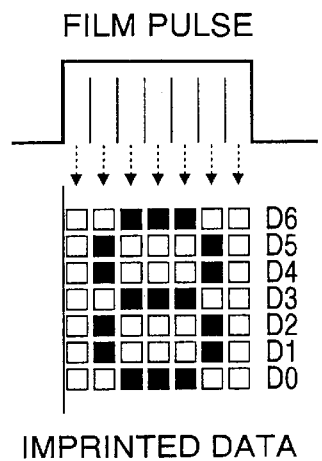
FIG. 8A shows a properly imprinted pattern of a character "8"

The characters are separated by the edges of the film pulse and the lines in each character are formed in synchronism with the 250 μm timer. When the film moves during the data imprinting and if the data imprinting device 24 is controlled to form the character "8", the proper pattern "8" is imprinted as shown in FIG. 8A.

Figure 8B:
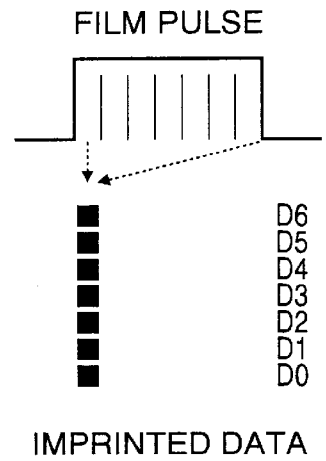
FIG. 8B shows an multiple exposure pattern of a character "8"

In irregular case, when the user rotates the film wind lever 19 by a half stroke and stops the rotation, the data pattern may not be properly imprinted. FIG. 8B is a fault sample of the imprinted data. In this case, the film is stopped after the edge of the film pulse is detected, causing multiple exposure. The formed pattern seems "1" even if the LED's are controlled to form "8".

Figure 9:
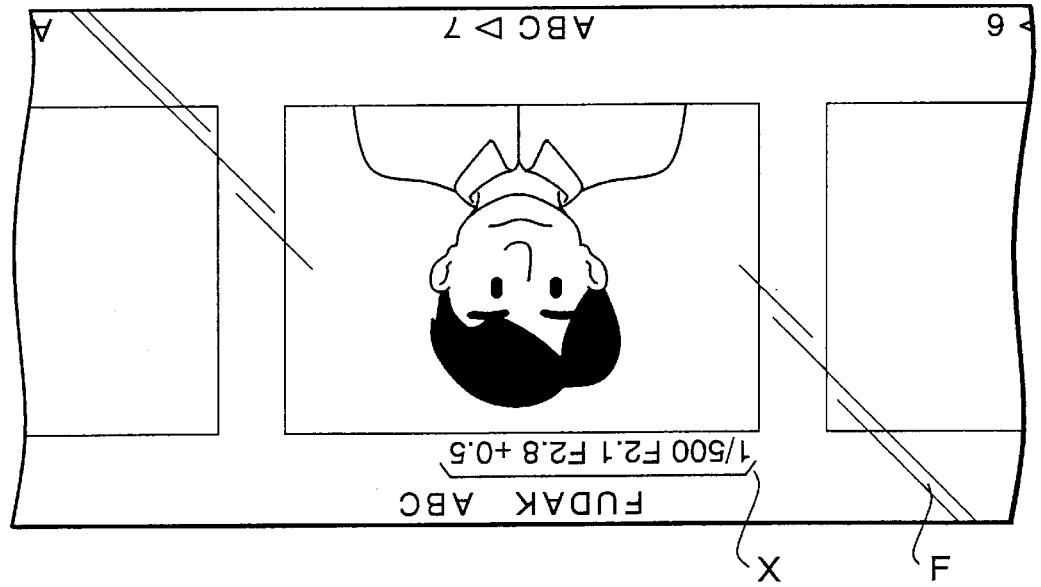
FIG. 9 shows a film on which the repeated data pattern is imprinted.

FIG. 9 shows a sample of an irregular case. When the character "8" of the AV data "F2.8" is imprinted, the film wind lever 19 stops. The first imprinted AV data pattern seems "F2.1". In such a case, the loop of steps S3 through S13 is broken at step S4. The CPU 60 sets the AV NG flag to "1" in step S18 in FIG. 6, and the current character counter value "10" is replaced with "7" in step S58 in FIG. 7. As a result, the AV data is again imprinted, indicating "F2.1 F2.8" on the film. The user can determine the later value is a correct information (i.e., the second value when two values are indicated).

In the embodiment, the data contains the TV, AV and XV data. However, the imprinting data are not limited in these three. A focal length or a date of photographing may be included.

The present disclosure relates to the subject matter contained in Japanese Patent Application No. HEI 10-242259, filed on Aug. 27, 1998, which is expressly incorporated herein by reference in its entirety.

What is claimed is:

1. A data-imprinting camera, comprising:
   a winding mechanism for manually winding a film loaded in a camera body;
   a data imprinting device for imprinting patterns of data onto said film; and
   a controlling device for controlling said data imprinting device in synchronism with the winding of said film by said winding mechanism, said controlling device being capable of repeating the data imprinting in one picture frame of said film.

2. The data-imprinting camera according to claim 1, wherein said controlling device includes a function to detect condition of the data imprinting and a function to repeat the data imprinting of the same data in said one picture frame when the detected result is faulty.

3. The data-imprinting camera according to claim 2, wherein said controlling device judges said detected result is faulty when the moving speed of said film is slower than a predetermined speed, and wherein said controlling device repeats to imprint the data that was imprinted when said detected result is judged to be faulty.

4. The data-imprinting camera according to claim 1, wherein said data imprinting device has a plurality of light emitting elements arranged such that light dots formed on said film are aligned in the direction perpendicular to the winding direction of said film, and wherein said controlling device controls the emissions of said light emitting elements in synchronism with the winding of said film to expose dot patterns indicating said data onto said film.

5. The data-imprinting camera according to claim 4, further comprising a follower roller that is rotated in synchronism with the winding of said film, a pulse generating mechanism that generates pulses corresponding to the rotation of said follower roller and a timer that periodically generates a plurality of timing signals between two consecutive edges of said pulses, and wherein said controlling device uses the edge of said pulses as separators of characters of said data and uses said timing signals for determining emission timings of said light emitting elements.

6. The data-imprinting camera according to claim 5, wherein said controlling device determines that the detected result is faulty when the predetermined numbers of edges of said pulses are not detected in the predetermined time interval.

7. The data-imprinting camera according to claim 1, wherein said data includes one of a shutter speed, an aperture value, an exposure compensation value, a focal length or a date of photographing.

8. A data-imprinting camera, comprising:
   a winding mechanism for manually winding a film loaded in a camera body;
   a data imprinting device for imprinting patterns of data onto said film, said data imprinting device having a plurality of light emitting elements arranged such that light dots formed on said film are aligned in the direction perpendicular to the winding direction of said film; and
   a controlling device for controlling the emissions of said light emitting elements in synchronism with the winding of said film by said winding mechanism, said controlling device including a function to detect condition of the data imprinting and a function to repeat the data imprinting in one picture frame of said film when the detected result is faulty.

9. The data-imprinting camera according to claim 7, further comprising a follower roller that is rotated in synchronism with the winding of said film, a pulse generating mechanism that generates pulses corresponding to the rotation of said follower roller and a timer that periodically generates a plurality of timing signals between two consecutive edges of said pulses, and wherein said controlling device uses the edge of said pulses as separators of characters of said data and uses said timing signals for determining emission timings of said light emitting elements.

10. The data-imprinting camera according to claim 8, wherein said controlling device determines that the detected result is faulty when the predetermined numbers of edges of said pulses are not detected in the predetermined time interval.

11. The data-imprinting camera according to claim 10, wherein said controlling device controls said light emission elements to form a plurality of kinds of the data patterns, said data pattern including a plurality of characters, and wherein said controlling device repeats to imprint the data from the first character of the data pattern that was imprinted when said detected result is judged to be faulty.

12. A data-imprinting device for a camera, comprising:
   a plurality of light emitting elements that form a plurality of light dots on a film of said camera, said plurality of light emitting elements being arranged such that the light dots formed on said film are aligned in the direction perpendicular to a winding direction of said film;
   an imprinting condition detecting system that detects whether imprinting of the data for a picture frame has been finished successfully;
   a controlling device that repeats data imprinting operation for the picture frame when the imprinting condition detecting system detects that imprinting of the data for the picture frame has not been finished successfully.

* * * * *